Patented June 22, 1954

2,681,853

UNITED STATES PATENT OFFICE 2,681,853

PLANT GROWTH REGULATION

Nathaniel Tischler, Palmyra, N. J., assignor to Sharples Chemicals Inc., a corporation of Delaware No Drawing. Application August 18, 1950,
Serial No. 180,320

18 Claims. (Cl. 71—2.4)

This invention relates to new and improved compositions of matter which are used for treating growing plants to alter the normal life cycle of said plants with advantageous results. It is particularly concerned with phytotoxic compositions which contain at least one of the 3,6-endoxohydro-orthophthalic acids as active ingredient, that is, as plant response agent.

Phytotoxic compositions containing at least one of the aforesaid acids, and particularly 3,6-endoxo-1,2,3,6-tetrahydro-orthophthalic acid and/or 3,6-endoxohexahydro-orthophthalic acid, per se or in equivalent form, and more particularly the exo-cis isomers, are highly effective for the purpose, and it is a feature of this invention to provide compositions containing the above active ingredients in admixture with simple, readily available materials which enhance, or intensify the plant response activity of the above active ingredients. These and other features will become apparent to persons skilled in the art as the specification proceeds.

Co-pending application Serial No. 81,026, filed March 11, 1949, by Nathaniel Tischler and Ernest P. Bell, now Patent 2,576,080 granted November 20, 1951, teaches the efficacy of the 3,6-endoxohydro-orthophthalic acids and their derivatives in bringing about useful plant response effects such as leaf abscission (partial or complete), blossom thinning, vine-kill, total destruction of the plant, adventitious root formation, or delay of fruit drop, the particular plant response manifested depending to a large extent upon the applied concentration of the response agent, and the species and degree of maturity of the plant undergoing treatment.

The use of 3,6-endoxohexahydro-orthophthalic acid, per se or in equivalent form, for the above purposes is particularly described and claimed in the co-pending application of Ernest P. Bell and Nathaniel Tischler, Serial No. 131,501, filed December 6, 1949 now Patent 2,576,081 granted November 20, 1951; and the use of 3,6-endoxo-1,2,3,6-tetrahydro-orthophthalic acid, per se or in equivalent form, for such purposes is particularly described and claimed in the co-pending application of the same inventors, Serial No. 131,502, filed December 6, 1949 now Patents 2,576,082 granted November 20, 1951. Both of these applications are continuations-in-part of said first-mentioned application.

The above-mentioned compounds as applied to plants may be in the form of the acid per se or in other form, such as in the form of the anhydride and/or a salt which contains the corresponding anion or anions of ortho configuration, the same as in the case of the acid per se, said anion or anions being either acid or neutral in character, in chemical combination with a sufficiency of cation or cations to satisfy valence requirements, such as one or more metal and/or metalloid cations such as sodium, potassium, calcium, strontium, magnesium, aluminum, iron, cobalt, nickel, zinc, cadmium, mercury, copper, ammonium, mono-, di- and trialkylammonium, mono-, di- and trialkanolammonium, and mixed alkylalkanolammonium which is N-substituted by from 2 to 3 radicals of the type indicated.

Thus the acid is the active material, and this is true whether it is used as such, or in the form of a salt, or anhydride, or other form. These changes at the carboxyl groups are mere changes in form rather than changes in substance.

Turning now to the present invention, which for convenience will be described more particularly with reference to 3,6-endoxohexahydro-orthophthalic acid and 3,6-endoxo-1,2,3,6-tetrahydro-orthophthalic acid (per se or in equivalent form) as active plant response ingredients of my new compositions, it is pointed out that said acids are appreciably soluble in water. The other forms are also water-soluble. Some of them are highly soluble, while others have a lesser degree of solubility. However, it is preferred to employ compounds having a solubility in water to the extent of at least 0.1% by weight, and still more particularly of at least 1% by weight.

Water solubility is desirable so that anions (acid or neutral or both) are formed when the acids, per se or in chemically equivalent form, are dissolved in water. The desirability of such anions will presently become apparent.

Acid anions may be theoretically illustrated by reference to the acid 3,6-endoxohexahydro-orthophthalate anion, by which is meant a univalent anion having a structure defined by the formula

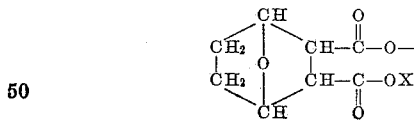

wherein X is a cation, usually considered by modern theory to be hydrogen.

Neutral anions may be theoretically illustrated by reference to the neutral 3,6-endoxohexahydro-orthophthalate anion, by which is meant a divalent anion having a structure defined by the formula

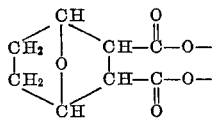

Theoretically, similar anions are formed when the tetrahydro acid or its chemically equivalent forms are dissolved in water.

Although the present applicant does not wish to be bound by any particular theory as to the mechanism whereby useful plant response effects are produced, a considerable amount of experimentation strongly indicates that said effects are brought about by the existence in aqueous media of anion or anions (acid and/or neutral) of the type illustrated above. Both neutral anion and acid anion are effective. A salient feature of this theory is that the acid or acids of the invention, when applied per se, or in other form, to a living plant, makes the desired anion or anions (acid and/or neutral) available to the plant, at or near the site of application, and through translocation phenomena, at points far removed from the site of application.

The desired anion or anions are made available by virtue of the fact that the acids per se, and their other forms, are water-soluble and ionizable. Therefore, when such a compound is absorbed into the vascular system of a plant, it dissolves in the aqueous plant juices and provides the functioning anion or anions. The resulting physiological activity is believed to be ascribable to the presence of said anion or anions. The acids per se and their other forms may thus be regarded as very convenient media for furnishing the desired anion or anions to susceptible portions of the plant.

It follows, therefore, that the acids per se and their other forms are equally usable.

The foregoing compounds are highly effective for the intended purpose.

I have discovered that the amount of the respective compounds used to produce a given plant response effect may be markedly reduced, or the plant response effect obtained with a given amount of active ingredient markedly increased, by admixing with any said compound or compounds, one or more of the group consisting of the alkali metal (e. g. sodium and potassium) and ammonium salts of peroxydisulfuric acid, commonly known as persulfuric acid; said salts being either in neutral or acid form.

Examples of such salts are sodium persulfate, sodium acid persulfate, potassium persulfate, potassium acid persulfate, ammonium persulfate, ammonium acid persulfate, and ammonium potassium persulfate.

As pointed out above, the persulfates contemplated include both the acid persulfates and the neutral persulfates, and mixed neutral persulfates, that is, persulfates in which the cations are different.

The preparation of persulfates may be accomplished by any means known to the art, and suitable methods will be found in the literature.

Likewise, the preparation of the 3,6-endoxo-hydro-orthophthalic acids, per se and in equivalent form, may be accomplished by any means known to the art, and suitable methods will suggest themselves to persons skilled in chemical synthesis upon becoming familiar with the chemical structure of such compounds.

The amount of additive or "intensifier" to be admixed with the endoxo compounds may vary over a very wide range. A small amount will produce a useful synergistic intensifying effect. On the other hand, and particularly since I have discovered that my intensifiers are in themselves capable of inducing phytotoxic effects, I contemplate the use within the broad scope of my invention of proportions of intensifier far in excess of those proportions producing optimum synergistic intensifying action. Thus in a sense either the endoxo compound or the persulfate compound may be regarded as the principal ingredient, and the other as the intensifier, since in any event a synergistic effect is produced by their admixture.

Generally speaking, for practicable purposes, proportions of intensifier to active ingredient of from 1:50 to 50:1, and particularly from 1:10 to 10:1 are very useful.

The intensifier and the active ingredient may be admixed in any desired manner such as by mere mechanical mixing in solid form, or while in solution in a common solvent such as water. It is of course preferred that solid admixtures be in finely divided, free-flowing form.

The admixtures are applied to the crop or plants in any desired manner, such as in the form of a solid, for example, by dusting, or in the form of a liquid, for example, by spraying.

Compositions may be formulated by mixing the admixture containing the intensifier and active ingredient with any desired liquid or solid carriers, such as any of the finely divided solid carriers known in the dusting art, which are preferably of large surface area, such as clay, for example, fuller's earth, pyrophyllite, talc, bentonite, kieselguhr, diatomaceous earth, etc. Any of the commercial clays available on the market in finely divided form may be used, and particularly those which are normally employed as insecticide carriers. Commercial clays, it will be understood, are generally identified by trade names (reflecting the source and mode of processing), of which Homer Clay, Celite, and Tripoli may be mentioned as typical.

Non-clay carriers which may be formulated with my admixture include, for example, sulfur, volcanic ash, calcium carbonate, lime, by-product lignin, lignocellulose, flour, such as wood, walnut shell, wheat, soybean, potato, cottonseed, etc.

Any desired mixture may be prepared by any suitable method. Thus, if a solid, the active ingredient may be ground to a fine powder and tumbled together with the intensifier, or the intensifier and the active ingredient may be ground together; alternatively, the active ingredient in liquid form, including solutions, dispersions, emulsions, and suspensions thereof, may be admixed with the intensifier in finely divided form in amounts small eough to preserve the free-flowing property of the final dust composition. Or excess liquid may be removed, such as by vaporization, for example, under reduced pressure. The same applies to mixtures of the active ingredient, the intensifier, and any finely divided solid carrier and/or other material.

When solid compositions are employed, in order to obtain a high degree of plant coverage with minimum poundage per acre, it is desirable that the composition be in finely divided form. Preferably, the dust containing the active ingredient should be sufficiently fine that substantially all will pass through a 50 mesh sieve, and more particularly through a 200 mesh sieve. Excellent results have been obtained in which the dust composition is comprised predominantly of particles in the range from 15 to 45 microns. Finer dusts, such as those consisting largely of particles in the range of 5 microns and below have excellent covering capacity but are somewhat more subject to drift and are more expensive to prepare.

For spray application the admixture may be dissolved or dispersed in a liquid carrier such as water or other suitable liquid.

Aqueous solutions or dispersions are economical and desirable. In general, the choice of the particular liquid carrier employed will be guided somewhat by prevailing circumstances, such as its availability, its solubility or dispersion characteristics toward the particular admixture employed, and/or its toxicity toward the plants undergoing treatment. In general, water is an excellent liquid carrier.

Thus, spray formulations comprising the active ingredient in the form of a solution, suspension, dispersion, or emulsion, in aqueous or non-aqueous media may be employed.

Emulsions or dispersions of the admixture in the liquid carrier may be prepared by agitation of the admixture with the carrier. This is commonly done at the time of spraying. Preferably, however, the agitation should take place in the presence of an emulsifying or dispersing agent (surface-active agent), in order to facilitate the preparation of said emulsion or dispersion. Emulsifying and dispersing agents are well known in the art, and include, for example, fatty alcohol sulfates, such as sodium lauryl sulfate, aliphatic or aromatic sulfonates, such as sulfonated castor oil or the various alkaryl sulfonates (such as the sodium salt of monosulfonated nonyl naphthalene or tertiary dodecyl benzene), and non-ionic types of emulsifying and dispersing agents such as the high molecular weight alkyl polyglycolethers or analogous thioethers such as the decyl, dodecyl and tetradecyl polyglycolethers and thioethers containing from 25 to 75 carbon atoms.

The use, if desired, of adjuvants, such as wetting agents and/or humectants, is also contemplated in connection with solid formulations and solutions of the admixture, such as water solutions. Any suitable wetting agent and/or humectant may be employed for this purpose, such as the wetting agents more particularly referred to above. Examples of humectants are glycerine, diethylene glycol, ethylene glycol, polyethylene glycols generally, and well known sugar-containing mixtures, such as corn syrup and honey.

For adjuvant purposes, any desired quantity of wetting agent may be employed, such as up to 250% or more based on active ingredient and intensifier. For wetting purposes, the amount of adjuvant used may be considered to be that required to impart the desired wetting qualities to the formulation, whether used in finely divided solid form or as a spray solution, or otherwise, such as from approximately 0.005% to 0.5% by weight of total formulation. The use of considerably larger amounts is not based upon wetting properties, although present, but is a function of the physiological behavior of the wetting agent after spraying upon the plant.

It should be considered that once the formulation has been applied to the plant, the concentration of wetting agent existing upon the plant is in no sense a function of the concentration existing in the original formulation, particularly in the case of a spray solution. Thus, evaporation might concentrate the wetting agent considerably in the case of a spray solution, or the presence of dew on the plant surfaces, or of plant juices on the plant surfaces might considerably dilute the wetting agent.

As will be seen, wetting agents, particularly when in solid form, may be compounded with the admixture when in solid form.

Although the admixture of active ingredient and intensifier may be applied to the growing plant in concentrated form, it is usually desirable to employ liquid or solid formulations, for example, as discussed above, in which the active ingredient and intensifier constitute less than 30% by weight of the total, such as less than 10% and even as low as 0.1%.

Other substances than the carrier and/or surface active agent may be included in solid or liquid formulations if desired. Thus, active ingredients and/or intensifiers other than those disclosed herein and compatible with the admixture may be added if desired for any particular purpose. Also substances may be added to bring about various physical improvements such as the prevention of lumping during storage, or improvement with respect to coverage, moisture adsorption, adherence, etc. Such other active ingredients and/or intensifiers may be included in said formulations to accomplish various physiological or other effects. For example, it may at times be expedient to include singly or in combination, substances such as fungicides, insecticides, bactericides, fertilizers, or types of plant response agents other than those agents discussed herein.

In practice of the process as applied to defoliation, the rate of application (i. e. the amount of admixture per crop unit) for best results will depend among other factors upon the species of plants being treated and upon their maturity. In any event, the amount of active ingredient employed for the same plant response effect will be substantially lower than when the intensifier is not present.

As a rule the more mature the plant at the time of application, the less active material is required. In practice, the crop is normally treated for defoliation purposes, 1 or 2 weeks prior to harvesting. In some instances, more than one application may be desirable, especially if heavy rains or winds should occur soon after the application, or to obtain an accumulative effect. Then too, in order to avoid possible injury to any particular crop, it may be desirable for an inexperienced operator to apply the formulation initially at a relatively low rate, and to follow with a second application if necessary after observation of the first effects, to obtain the degree of defoliation desired.

Use of dosages greatly in excess of the minimum required for good defoliation may result in shock to the plant with attendant injury to the remainder of the plant.

In fact, the plant response compositions of the present invention are effective herbicides when used in amounts substantially greater than those required for defoliation, and they may be used advantageously for the killing of plants or vines (as in the case of potatoes) when desired, such as, for the killing of undesired plants, for example, weeds or grasses, or for the killing of crops, irrespective of whether such undesired plants or crops are of species which lend themselves to defoliation.

Thus when defoliation is the objective the quantity applied should be sufficient to cause at least the major portion of the leaves to dry up and/or to drop from the living plant, but insufficient to cause substantial herbicidal action on the plant. On the other hand, when plant killing is the objective, any amount sufficient for this purpose may be applied. In the latter connection, since different species of plants vary markedly in their relative resistance to herbicidal action, selective killing of plant species may be practiced. Such selectivity may be varied by compounding, such as with adjuvants, for example, wetting agents, in addition to the use of an intensifier.

I am aware of the fact that it has been proposed to use certain ammonium salts, such as ammonium sulfate, in combination with phenolic substances, such as dinitroalkylphenols and pentachlorophenol, for plant response purposes. The purpose of such use of ammonium salts as explained by Crafts and Reiber, Hilgardia, volume 16, pages 487–499, and by Crafts, Science, volume 108, pages 85–86, is to make available the free phenol at the plant surface from an aqueous solution of a water-soluble salt of said phenol. The phenol in such cases is the active plant response substance and is continuously regenerated at the plant surface from its water-soluble salt by virtue of the presence of the ammonium salt. As the free phenol is absorbed by the plant surface, further free phenol is generated under equilibrium conditions. The plant response effect of the free phenol is not enhanced or intensified by such procedure, or in other words, is substantially the same as that obtained by the application directly to the plant of a similar quantity of free phenol. In view of the insolubility of the phenol in water, this procedure is adopted in order to make available the use of water as a vehicle for applying the plant response agent, i. e. herbicide, to the plant surfaces.

In the case of my invention, on the other hand, the plant response effect obtained from a given quantity of active ingredient is greater than that obtained by the application of the same quantity of the particular active ingredient to the plant in the absence of my intensifier. In fact, the plant response effect obtained with the same quantity of active ingredient may be increased many times by the addition of larger quantities of my intensifier. The intensification begins to manifest itself by the addition of a small proportion of my intensifier and increases to a point of optimum intensification by the addition of increasing proportions of intensifier. For optimum plant response effects, the proportion of intensifier to active ingredient may vary somewhat between specific active ingredients and between specific varieties of plants undergoing treatment, so that the exact proportion for optimum effect under all conditions cannot be given. However, the intensification of the plant response effect is present when a small quantity of intensifier is added, and the addition of intensifier beyond the point at which no further marked increase in synergistic intensification is obtained does no harm, and may have a very useful purpose, for, and as brought out above, generally speaking either the endoxo compounds or the persulfate compounds may be regarded as the active ingredients with the other regarded as the synergistic intensifiers, since both exhibit marked plant response effects, although for purposes of particular description, I prefer to regard the endoxo compounds as the active ingredients and the persulfate compounds as the synergistic intensifiers.

The exact mechanism by which the synergistic intensification of the active ingredient is obtained in the practice of my invention is not known. However, such synergistic intensification is cogently demonstrated by the following examples which are by way of illustration and not of limitation.

*Example 1*

Separate groups of eight potted Dwarf Horticultural bean plants at the stage at which the first trifoliate leaf was still furled were dipped to the first nodes into the respective test solutions used, and the excess solution was shaken off.

The test solutions were 0.062%, 0.125%, 0.25%, 0.5%, and 1.0% aqueous solutions of ammonium persulfate, ammonium thiocyanate, ammonium sulfamate, and ammonium sulfate, respectively.

Observations made six days after the applications were as follows.

In the following table, 4S, for example, means each of four plants had a single primary leaf abscised; 2B, for example, means each of two plants had both primary leaves abscised. PL means primary leaves; TS means trifoliate shoots. The same code applies wherever applicable in the other examples.

| Concentration | Physiological effects | | | |
| --- | --- | --- | --- | --- |
| | Ammonium persulfate | Ammonium thiocyanate | Ammonium sulfamate | Ammonium sulfate |
| 0.062% | PL partly shrivelled; TS slightly retarded. | PL moderately burned; TS not retarded. | No effect | No effect. |
| 0.125% | 2B, 4S; adhering PL partly shrivelled; TS considerably retarded. | PL considerably burned; TS slighted retarded. | No effect | No effect. |
| 0.25% | 2B, 4S; adhering leaves withered and "frozen"; TS considerably retarded. | 1S; PL partly shrivelled; TS considerably retarded. | PL light marginal burns; TS slightly retarded. | PL light marginal burns; TS unaffected. |
| 0.5% | 8B; TS severely retarded and considerably injured. | 5S; PL shrivelled to withered; TS severely retarded. | PL considerably burned to partly shrivelled; TS severely retarded. | PL moderate marginal burns; TS unaffected. |
| 1.0% | One plant dead, four dying, three severely injured. | 3B, 3S; PL withered and "frozen"; TS severely retarded. | PL shrivelled; TS severely retarded. | PL considerably burned to shrivelled; TS considerably retarded. |

The term "frozen" as used to describe a condition of the leaves of a plant treated with a defoliant denotes that condition in which the leaves have undergone such a quick and drastic response that no abscission layer has formed. The leaves then cling tenaciously to the plant although the leaf blade and petiole are dead and shrivelled, and show no tendency to abscise. Thus, it is to be understood that "freezing" of leaves indicates a more phytotoxic condition that when the leaves actually abscise.

This experiment demonstrates that ammonium persulfate is considerably more phytotoxic than the three well-known plant response agents with which it was compared.

Example 2

Two series of aqueous solutions of disodium 3,6-endoxohexahydro-orthophthalate were prepared, one without and one with 0.05% of ammonium persulfate, at the following concentrations of the former: 0.001%, 0.0025%, and 0.005%.

For testing purposes, the procedure of the preceding example was followed with the same kind of bean plants.

Observations made four days later were as follows. The symbol A in the table represents disodium 3,6-endoxohexahydro-orthophthalate.

| Conc. of A | Physiological effects | |
|---|---|---|
| | Without $(NH_4)_2S_2O_8$ | With 0.05% $(NH_4)_2S_2O_8$ |
| 0 | | 1S; PL partly shrivelled; TS slightly retarded. |
| 0.001% | 1S; PL moderately burned; TS unaffected. | 6B, 1S; PL shrivelled; TS severely retarded. |
| 0.0025% | 5B, 2S; PL considerably burned; TS considerably retarded. | 2B, 2S; adhering PL withered and "frozen"; TS severely retarded. |
| 0.005% | 6B, 2S; adhering PL withered and "frozen"; TS severely retarded. | 1B; adhering PL withered and "frozen"; TS severely retarded. |

Example 3

A 1.0% aqueous solution of disodium 3,6-endoxohexahydro-orthophthalate was spray-misted by means of a small De Vilbiss atomizer onto a group of twelve potted young Dwarf Horticultural bean plants. The plants were at a stage of growth at which the first and second trifoliate leaves had developed.

This group of plants was arranged uniformly in a 2 foot by 3 foot area, and 3 ml. of test solution was uniformly sprayed in the described manner onto the area. This rate of application corresponds to 6 gallons per acre; this low volume rate simulates practical conditions of aeroplane spraying. Thus the amount of disodium 3,6-endoxohexahydro-orthophthalate was 0.5 pound per acre. This test will be symbolized in the table below as A.

A parallel test was carried out in which the 1.0% aqueous solution of disodium 3,6-endoxohexahydro-orthophthalate also contained 5.0% of ammonium persulfate. Thus the amount of ammonium persulfate was 2.5 pounds per acre. This test will be symbolized as B.

Another parallel test was carried out, using a 5.0% aqueous solution of ammonium persulfate, that is, a dosage of 2.5 pounds per acre. This test will be symbolized as C.

Observations made six days later were as follows:

| Test | Physiological effects |
|---|---|
| A | 50% defoliation; no stem or petiole injury. |
| B | 98% defoliation; considerable stem or petiole injury. |
| C | 60% defoliation; no stem or petiole injury. |

In the interpretation of data as to defoliation, it must be kept in mind that some leaves on individual plants are much more susceptible to defoliation than other leaves, and that, consequently, it is relatively much easier to bring about defoliation of say 40% to 60%, than to carry the defoliation up to say 75% to 95% or higher. It does not follow, therefore, that substantially complete defoliation can be caused merely by the use of more, percentagewise, of the same defoliant. In other words, a high degree of defoliation is relatively speaking much more difficult to attain than moderate defoliation. Thus the data of the preceding Example 3 definitely demonstrates the presence of marked synergism.

Example 4

In this experiment, the test solutions were spray-misted onto individual groups of potted Henderson bush lima beans, using the same technique as in Example 3. Each group consisted of twelve plants at a stage of growth at which the first trifoliate leaf was well developed.

The respective aqueous test solutions contained: (A) 0.5% of disodium 3,6-endoxohydro-orthophthalate; (B) 0.5% of the same plus 2.5% of potassium persulfate; and, (C) 0.5% of the same plus 2.5% of ammonium persulfate.

The following physiological effects were observed after five days:

A. Approximately 15% defoliation
B. Approximately 25% defoliation
C. Approximately 75% defoliation

Example 5

Separate groups of eight potted Dwarf Horticultural bean plants at the stage at which the first trifoliate leaf was still furled were treated with aqueous test solutions by the procedure of Example 1.

One group was treated with 0.1% ammonium persulfate and one day later it was observed that the plants were considerably burned. Another group was treated with 0.1% potassium persulfate, and after the same interval it was observed that the plants were lightly to moderately burned.

In contrast, another group treated with 5% ammonium sulfate was not affected after one day. Still another group was treated with 10% ammonium sulfate; after one day, some of the plants were not affected and some were only lightly burned.

The endoxo compounds are capable of existing in three separate and distinct geometrically isomeric forms, namely, the exo-cis isomer, the endo-cis isomer, and the trans isomer, as defined by Woodward and Baer, Journal of the American Chemical Society, 70, 1161–1166. Of these three isomers the exo-cis isomer is preferred in view of its generally greater activity. Furthermore, the exo-cis isomer can be prepared more economically and conveniently. The endoxo ingredient in the foregoing examples was of the exo-cis isomeric form.

When the endoxo ingredients are used in the form of the acids per se and/or their anhydrides, aqueous solutions containing such acids and/or anhydrides probably contain non-ionized acid and/or anhydride in equilibrium with ionized material. Similar considerations might apply to some of the salts.

The alkylammonium salts of 3,6-endoxohydro-orthophthalic acids, such as monoalkylammonium, dialkylammonium, or trialkylammonium salts preferably have from 1 to 12 carbon atoms in each alkyl radical, the totality of carbon atoms in such alkyl radical or radicals preferably being not more than 12. The alkanolammonium salts such as monoalkanolammonium, dialkanolammonium, or trialkanolammonium preferably have from 2 to 3 carbon atoms in each alkanol radical. The mixed alkylalkanolammonium salts such as monoalkyl monoalkanolammonium, dialkyl monoalkanolammonium, or monoalkyl dialkanolammonium preferably have from 1 to 4 carbon atoms in each alkyl radical and from 2 to 3 carbon atoms in each alkanol radical.

The following are examples of salts of 3,6-endoxohydro-orthophthalic acids.

Examples of monoalkylammonium salts are the monomethylammonium, monoethylammonium, monopropylammonium, monobutylammonium, monoamylammonium, monohexylammonium, monoheptylammonium, monooctylammonium, monononylammonium, monodecylammonium, monoundecylammonium, monododecylammonium and similar monoalkylammonium salts of such acids.

Examples of dialkylammonium salts are the dimethylammonium, diethylammonium, dipropylammonium, dibutylammonium, diamylammonium, dihexylammonium, methylethylammonium, ethylpropylammonium, propylbutylammonium, butylamylammonium, amylhexylammonium, methylundecylammonium, and similar dialkylammonium salts of such acids.

Examples of trialkylammonium salts are the trimethylammonium, triethylammonium, tripropylammonium, tributylammonium, methyldiethylammonium, ethyldipropylammonium, propyldibutylammonium, methyldiamylammonium, ethyldiamylammonium, methylethylpropylammonium, ethylpropylbutylammonium, and similar salts of such acids.

Examples of monoalkanolammonium salts are the monoethanolammonium, monopropanolammonium, and similar salts of such acids.

Examples of dialkanolammonium salts are the diethanolammonium, dipropanolammonium, ethanolpropanolammonium and similar salts of such acids.

Examples of trialkanolammonium salts are the triethanolammonium, tripropanolammonium, ethanoldipropanolammonium, propanoldiethanolammonium and similar salts of such acids.

Examples of monalkyl monoalkanolammonium salts are the methylethanolammonium, ethylethanolammonium, propylethanolammonium, butylethanolammonium, methylpropanolammonium, ethylpropanolammonium, propylpropanolammonium, butylpropanolammonium, and similar salts of such acids.

Examples of dialkyl monoalkanolammonium salts are the dimethylethanolammonium, diethylethanolammonium, dipropylethanolammonium, dibutylethanolammonium, dimethylpropanolammonium, diethylpropanolammonium, dipropylpropanolammonium, dibutylpropanolammonium, methylethylethanolammonium, methylethylpropanolammonium, ethylpropylethanolammonium, ethylpropylpropanolammonium, propylbutylethanolammonium, propylbutylpropanolammonium, and similar salts of such acids.

Examples of monoalkyl dialkanolammonium salts are the methyldiethanolammonium, ethyldiethanolammonium, propyldiethanolammonium, butyldiethanolammonium, methyldipropanolammonium, ethyldipropanolammonium, propyldipropanolammonium, butyldipropanolammonium, methylethanolpropanolammonium, ethylethanolpropanolammonium, propylethanolpropanolammonium, butylethanolpropanolammonium, and similar salts of such acids.

As pointed out above the salts contemplated include both the acid salts and the neutral salts, and mixed neutral salts, that is salts in which the cations are different.

The term plant as used herein is understood to include all portions of the plant, such as the roots, stems, leaves, blossoms, seeds, and fruits.

Among the plants which defoliate naturally and which may be defoliated by the use of this invention, are for example, cotton, potatoes, tomatoes, and beans such as soy beans and lima beans.

Among the noxious weeds against which my compositions evidence outstanding herbicidal properties are the following: bindweed, chickweed, cocklebur, mare's tail, shepherd's-purse, broad-leaved plantain, wild lettuce, ragweed, spurge, dock, and wild carrot.

My new compositions are generally applicable as herbicides, such as in pre-emergence or pre-planting practices for the control of weeds, in post-emergence treatment for control of weeds as to such useful crops to which the formulation evidences only slight or no herbicidal action, and otherwise following agricultural practices.

From the foregoing it can be seen that the endoxo compounds used in the practice of this invention, whether used as the acid or in some other form, are highly effective in regulating the growth characteristics of viable or living plants, and particularly of plants having vascular systems, when used in admixture with the persulfates of this invention. For example, the admixture may be employed to hasten defoliation of plants which defoliate naturally, or may be employed to terminate the life cycle of plants, or may be employed to retard the growing of seeds, or may be employed to selectively stunt or terminate the growth of certain unwanted plants to facilitate and favor the growth of wanted plants, or may be employed to terminate the growth of vines in favor of, or to facilitate harvesting of, the fruits of such vines, or may be employed to stimulate root growth on cuttings, etc. Other applications of the invention in the regulation of the growth characteristics of plants will occur to persons skilled in the art upon becoming familiar herewith.

Accordingly, it is to be understood that the particular description is by way of illustration and that the patent is intended to cover by suitable expression in the claims whatever features of novelty reside in the invention.

This application is a continuation-in-part of my copending application Serial No. 161,255, filed May 10, 1950, now Patent 2,576,083 granted November 20, 1951.

I claim:

1. A plant response composition comprising a compound which when in the presence of water yields anions of an acid of the group consisting of 3,6-endoxo-1,2,3,6-tetrahydro-orthophthalic acid and 3,6-endoxohexahydro-orthophthalic acid, and a salt of persulfuric acid with at least one of the group consisting of sodium, potassium, and ammonia.

2. A plant response composition comprising a compound which when in the presence of water yields anions of 3,6-endoxohexahydro-orthophthalic acid, and a salt of persulfuric acid with at least one of the group consisting of sodium, potassium, and ammonia.

3. The composition of claim 2 in which said anion is in the exo-cis isomeric form.

4. The composition of claim 3 in which said salt is an ammonium persulfate.

5. The composition of claim 4 in which said salt has the composition $(NH_4)_2S_2O_8$.

6. The composition of claim 5 having admixed therewith a wetting agent.

7. A plant response composition comprising a compound which when in the presence of water yields anions of 3,6-endoxo-1,2,3,6-tetrahydro-orthophthalic acid, and a salt of persulfuric acid with at least one of the group consisting of sodium, potassium, and ammonia.

8. The composition of claim 7 in which said anion is in the exo-cis isomeric form.

9. The composition of claim 8 in which said salt is an ammonium persulfate.

10. The composition of claim 9 in which said salt has the composition $(NH_4)_2S_2O_8$.

11. The composition of claim 10 having admixed therewith a wetting agent.

12. A method of regulating the growth characteristics of a plant, which comprises applying to said plant in amount sufficient to obtain the desired effect a composition comprising a compound which when in the presence of water yields anions of an acid of the group consisting of 3,6-endoxo-1,2,3,6-tetrahydro-orthophthalic acid and 3,6-endoxohexahydro-orthophthalic acid, and a salt of persulfuric acid with at least one of the group consisting of sodium, potassium, and ammonia.

13. A method for inducing plant response in a living plant, comprising applying to said plant in amount sufficient to obtain the desired effect a composition comprising a compound which when in the presence of water yields anions of exo-cis-3,6-endoxohexahydro-orthophthalic acid, and a salt of persulfuric acid with at least one of the group consisting of sodium, potassium, and ammonia.

14. A method for inducing plant response in a living plant, comprising applying to said plant in amount sufficient to obtain the desired effect a composition comprising a compound which when in the presence of water yields anions of exo-cis-3,6-endoxo-1,2,3,6-tetrahydro-orthophthalic acid, and a salt of persulfuric acid with at least one of the group consisting of sodium, potassium, and ammonia.

15. A method of regulating the growth characteristics of a plant which comprises applying to said plant in amount sufficient to obtain the desired effect a salt selected from the group consisting of the sodium, potassium, and ammonium salts of persulfuric acid, said salt having admixed therewith disodium exo-cis-3,6-endoxohexahydro-orthophthalate.

16. A method of regulating the growth characteristics of a plant which comprises applying to said plant in amount sufficient to obtain the desired effect an ammonium salt of persulfuric acid, said salt having admixed therewith disodium exo-cis-3,6-endoxohexahydro-orthophthalate.

17. The method of claim 16 in which the salt has the composition $(NH_4)_2S_2O_8$.

18. The method for inducing a phytotoxic response in a living plant having a vascular system, comprising bringing into association with said vascular system of said plant an effective amount of a composition comprising a salt selected from the group consisting of the sodium, potassium, and ammonium salts of persulfuric acid, and a compound which when in the presence of water yields anions of exo-cis-3,6-endoxohexahydro-orthophthalic acid.

References Cited in the file of this patent

FOREIGN PATENTS

| Number | Country | Date |
| --- | --- | --- |
| 16,014 of 1894 | Great Britain | July 6, 1895 |

OTHER REFERENCES

New Zealand J. of Agriculture, March 20, 1934, pages 172 and 173.

Thorpe, Dictionary of Applied Chemistry (1921), vol. 7, page 455.